Aug. 5, 1969 R. F. BAKER 3,459,887

AUTOMATIC FREQUENCY CONTROL SYSTEM

Filed April 11, 1966 2 Sheets-Sheet 1

INVENTOR.
Roy F. Baker
BY Francis W. Crotty
Attorney

AUTOMATIC FREQUENCY CONTROL SYSTEM

Filed April 11, 1966

2 Sheets-Sheet 2

INVENTOR.
Roy F. Baker
BY Francis W. Crotty
Attorney

United States Patent Office 3,459,887

Patented Aug. 5, 1969

3,459,887

AUTOMATIC FREQUENCY CONTROL SYSTEM

Roy F. Baker, Chicago, Ill., assignor to Zenith Radio Corporation, Chicago, Ill., a corporation of Delaware Filed Apr. 11, 1966, Ser. No. 541,624
Int. Cl. H04n 3/16, 5/50
U.S. Cl. 178—7.5 9 Claims

ABSTRACT OF THE DISCLOSURE

The automatic frequency control of a television receiver includes the usual discriminator and a pair of diodes with their load circuits, operating in conventional manner over a small range of frequency deviations centered about the desired mean frequency. Extended pull-in is achieved by biasing one diode forwardly and the other reversely so that for conditions of gross mistuning control voltages are obtained from the two diodes that are of the same polarity and aid one another in obtaining an augmented frequency correcting effect.

Figures 1, 3:
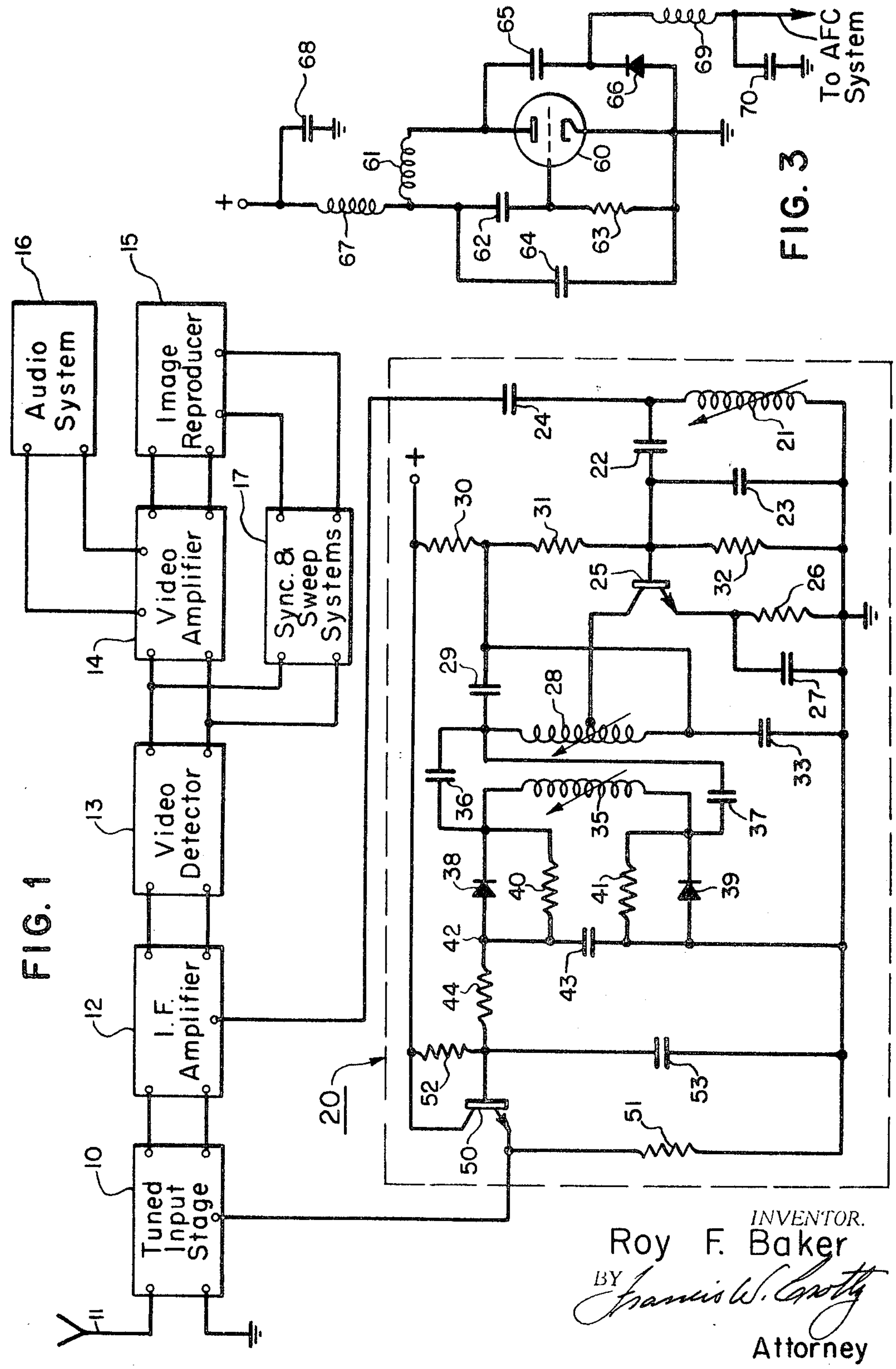

The present invention is directed to improvements in an automatic frequency control (AFC) system for television receivers.

The general concept of AFC for a superheterodyne receiver is certainly well known in the art and has been adopted to sound receivers as well as to television receivers of both the monochrome and color variety. The general purpose of such a system is to assist the user in attaining proper tuning of the receiver without requiring critical manual adjustment. The advantage of such a system is self-evident but its value to a color receiver is distinctly enhanced due to the fact that improper tuning of a color receiver manifests itself in incorrect colors, or even a total lack of color, in the reproduced image.

Since the broadcast specifications of the Federal Communications Commission dictate vestigial sideband transmission, the assigned picture carrier frequency is located midway on the slope at the high end of the intermediate frequency (IF) bandpass characteristic. The AFC system is tuned to a reference or center frequency corresponding to this desired picture IF frequency and so long as the tuning is reasonably close, within the response of the AFC system, an error voltage is developed to correct the tuning. With arrangements of the prior art, however, in the face of a poor condition of tuning which results in an actual picture IF that is higher than its desired value, the AFC system develops one component of error voltage in response to the picture carrier and another component of error voltage from the sound carrier of the channel that is sought to be tuned in. These components of error voltage are of opposite polarity and tend to defeat the corrective effect of the AFC system; indeed they undesirably restrict the pull-in range over which the AFC is effective. In extreme cases, the AFC system may even lock to the sound carrier rather than to the picture carrier of the desired channel which obviously is an intolerable result.

Accordingly, it is an object of the present invention to provide an improved AFC system for a television receiver.

It is a specific object of the invention to provide an AFC system for a television receiver which has a larger effective pull-in range than like systems of the prior art.

It is a further specific object of the invention to improve the AFC system of a television receiver to minimize the possibility of locking to the sound, rather than to the picture, carrier of the desired channel.

Hence, the invention provides an AFC system for a television receiver having a tunable input stage for selecting a particular broadcast channel comprising a video modulated carrier and an audio modulated carrier having a fixed frequency separation from one another and for deriving therefrom an intermediate frequency signal having video and audio cmponents of desired respective values. The AFC system comprises means, including a common frequency modulation detector responsive to the intermediate frequency signal of the receiver, for developing a first control effect of a predetermined polarity and of a magnitude dependent upon deviation in a predetermined direction of the actual frequency of the video IF component from its desired value and for concurrently developing a second control effect of the same polarity and of a magnitude dependent upon deviation in the aforesaid predetermined direction of the actual frequency of the audio IF component from its desired value. Means are provided for utilizing both of these control effects to control the operating frequency of the heterodyne oscillator of the receiver to maintain the frequencies of the video IF and sound IF at their respective desired values.

In its preferred form, the invention employs a frequency modulation detector having the usual discriminator network driving a pair of diode rectifiers provided with individual load circuits. The AFC or error voltage is the net voltage attained in combining the outputs of these rectifiers in series opposition in the usual way. A biasing arrangement is used to establish a forward bias on one diode and a reverse bias on the other in order to shape the frequency response characteristic of the FM detector as required to accomplish derivation of the aforementioned first and second control effects of like polarity.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIGURE 1 is a schematic representation, partially in the form of a block diagram, of a television receiver including an AFC system constructed in accordance with the subject invention;

FIGURES *2a*–*2d* are curves employed in describing operating characteristics of the receiver of FIGURE 1;

And FIGURE 3 is a schematic representation of a voltage controlled heterodyne oscillator that may be employed in the receiver of FIGURE 1.

Referring now more particularly to FIGURE 1, the arrangement there represented is a television receiver of the intercarrier type although the invention is applicable to any receiver employing the principle of superheterodyne reception. Moreover, the representation is of only those portions of the receiver that are used in monochrome reproduction even though the AFC system to be described is the same in structure, operation and connection with the remaining major components of the receiver whether the instrument be for monochrome or color reproduction. The representation selected leads to simplification of the drawing and is not to be considered as a restriction on the application of the invention.

The receiver has a tunable input stage 10 having input terminals connected to a wave signal antenna 11. This stage includes the customary tunable RF amplifier, variable frequency heterodyne oscillator and mixer for selecting a particular broadcast channel from the several channels that are usually available in a given location. Each such channel is made up of a video modulated carrier and an audio modulated carrier having a fixed frequency separation of 4½ megacycles from one another. The function of the input stage is to derive from the selected channel an intermediate frequency signal having video and audio components of desired respective values for application to an IF amplifier 12 of any desired number of stages. The amplified IF signal is detected in a video detector 13 and the detected output is delivered to video amplifier 14 wherein the video frequency components are further amplified for application to an image reproducer 15.

In accordance with intercarrier practice, an intercarrier component comprising a carrier of 4½ megacycles frequency modulated with audio is developed in video detector 13 and separated in a suitable frequency selective load included in video amplifier 14. The intercarrier component is supplied to a conventional audio system 16.

Image reproduction in unit 15 requires deflection of a cathode-ray beam to scan a two-dimensional image screen in synchronism with scanning that takes place at the transmitter in developing the program signal. This control of the image reproducer is afforded by a synchronizing and sweep system 17 coupled to the output of video detector 13 in order to be timed by the synchronizing components of the received video signal.

An AFC system 20 has an input coupled to an output terminal of IF amplifier 12 and an output coupled to the tunable element of input stage 10. This unit embodies the invention and will be described in detail presently.

Aside from AFC system 20, the described arrangement is a television receiver of conventional design and construction, the operation of which is well understood in the art and need not be further amplified. Accordingly, attention will be directed to the specifics of AFC system 20.

This system comprises means, including a common frequency modulation detector responsive to the IF signal of the receiver, for developing a first control effect of a predetermined polarity and of a magnitude dependent upon deviation in a predetermined direction of the actual frequency of the video IF component from its desired value and for concurrently developing a second control effect of the same predetermined polarity and of a magnitude dependent upon deviation in the same predetermined direction of the actual frequency of the audio IF component from its particular desired value. Structurally, the AFC system has an input including a variable inductor 21 and capacitors 22, 23, collectively defining a selector that is tuned to the IF frequency. A coupling cacapacitor 24 connects the tuned input preferably to the last stage of IF amplifier 12. The input selector connects to the base of a driving transistor 25 which has an emitter coupled to ground through a resistor 26 bypassed by a capacitor 27. The collector of transistor 25 connects to a tap on an adjustable inductor 28 tuned by a capacitor 29. Operating potentials are applied to transistor 25 from a source designated + through series connected resistors 30, 31 and 32. The junction of resistors 30 and 31 is bypassed to ground by a capacitor 33 and connects through the tap of inductor 28 to the collector while the junction of resistors 31 and 32 connects with the base of the transistor.

Another variable inductor 35 is magnetically coupled to inductor 28 and is tuned by capaciors 36 and 37 the common terminal of which connects to the high potential terminal of inductor 28. Tuned circuits 28–29 and 35–37 constitute a known form of discriminator network having tunable primary and secondary circuits. A pair of rectifiers, here shown as diodes 38, 39, is connected to the output terminals of the discriminator network; in particular, the cathode of each diode connects to an output terminal of secondary 35–37. Resistors 40 and 41 provide load circuits for the diodes and the AFC or error voltage is available at terminal 42, as the net voltage developed across the diode loads in series opposition. The output terminal is bypassed to ground by a capacitor 43 and is coupled through a resistor 44 to an emitter follower stage including a transistor 50. The emitter of this transistor is grounded through a load resistor 51 and its collector connects with biasing source + which also connects to the base through a biasing resistor 52. A connection from the high potential terminal of emitter load 51 to the tunable element of the heterodyne oscillator in stage 10 constitutes means for utilizing both of the control effects developed in the AFC system, in a manner to be described hereafter, to control the frequency of the oscillator and maintain the frequencies of the video and audio components at their desired respective values. The connection from output terminal 42 of the FM detector to the biasing source through resistors 44 and 52 constitutes means for biasing one of the rectifiers into a conductive condition and for biasing of the other into a nonconductive condition. More specifically, diode 38 is forward biased and diode 39 is reverse biased.

In considering the operation of the described AFC system, reference is made to the curves of FIGURE 2. The curve of FIGURE 2*a* is a generally idealized bandpass characteristic of IF amplifier 12 from which it appears that the picture carier is 6 db down on the slope at the high frequency end of the band. The sound carrier on the other hand is much farther down on the slope at the low end of the band, usually in the order of 24 db or greater. These carriers in accordance with current practice occur at 45.75 and 41.25 megacycles respectively.

The trap for the sound carrier of the adjacent higher broadcast channel falls at 47.25 megacycles and the frequency representing the picture carrier of the lower adjacent channel is at 39.75 megacycles. If the forward and reverse bias of the detector diodes is neglected, the response of the FM detector of AFC system 20 to the output of the IF amplifier is that shown by the curve of FIGURE 2*b*. The customary zero response or center reference frequency $f_0$ of the AFC system corresponds to the desired frequency of the video IF component and the response is symmetrical about this point over a deviation range $\Delta f$. Within this range, the error voltage of the AFC system has a polarity which is determined by the sense and an amplitude which is proportional to the extent of frequency deviation of the video IF component from the reference or zero response of the AFC system. The application of the error voltage to the heterodyning oscillator of input stage 10 adjusts the operating frequency of that oscilaltor to maintain the picture carrier at its desired value in a fashion that is well understood in the art. So long as the receiver is tuned within or relatively close to the range $\Delta f$, the AFC system is able to correct imperfections in tuning.

Figure 2A:
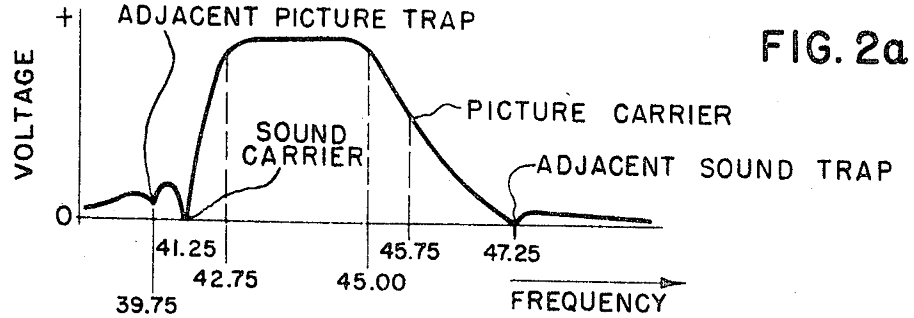
Figure 2B:
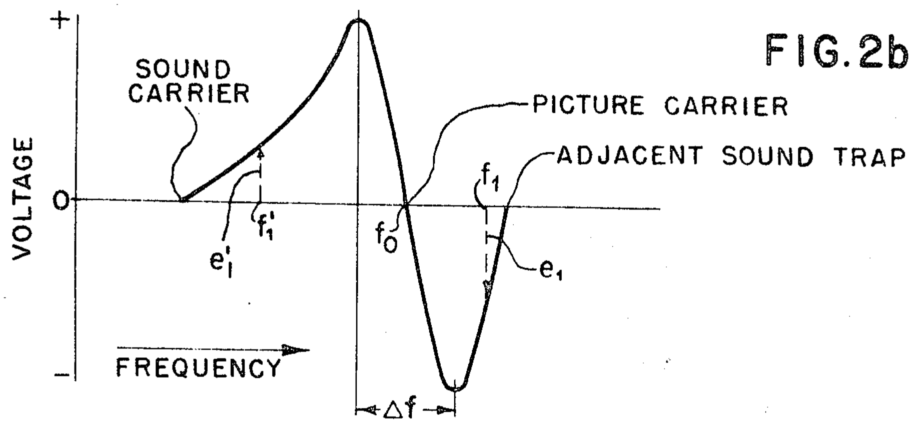

For gross errors in tuning which results in deviations beyond the range of $\Delta f$, the error voltage decreases with the degree of mistuning, falling more rapidly toward the high frequency end than toward the low frequency end of the IF bandpass as reflected by the curve of FIGURE 2*b*. It is this property of conventional AFC systems that leads to the real possibility of locking on the sound carrier as distinguished from the picture, carier of a channel that is being tuned.

In explaining the operation of the AFC system in this respect, let it be assumed that the receiver tuning has caused an actual frequency of the video IF component above the band $\Delta f$ at a value $f_1$. The arrow $e_1$ designates the component of error voltage developed in the AFC system in response to the video IF component; it is of negative polarity. For the same operating condition, the sound IF component has an actual frequency at the value $f_1'$, since the video and audio signals have a fixed frequency separation, and the response of the AFC system to the audio component is shown by the arrow $e_1'$. It is of positive polarity and reduces the net error voltage developed in the AFC system when, in fact, a greater correcting voltage is desired to restore proper conditions of tuning. It will be apparent that for still greater degrees of mistuning, yielding still higher values of actual frequencies of the video and audio components, a condition may be reached in which the amplitude of the component of error voltage $e_1'$ is equal to that of component $e_1$. Since these components have opposite polarities, the net error voltage ultimately becomes zero and this limits the pull-in range of the AFC system. For greater degrees of mistuning, component $e_1'$ exceeds the value of component $e_1$, giving a net positive AFC voltage which increases, rather than decreases, the operating frequency of the heterodyne oscillator. This increases the frequency deviation still further and has a regenerative effect, further increasing the operating frequency of the heterodyne oscillator until finally the actual frequency of the sound component falls at the reference frequency $f_0$ in the center of frequency $\Delta f$. This is the undesired condition of locking to the sound carrier which typifies conventional AFC systems of the prior art.

Figure 2C:
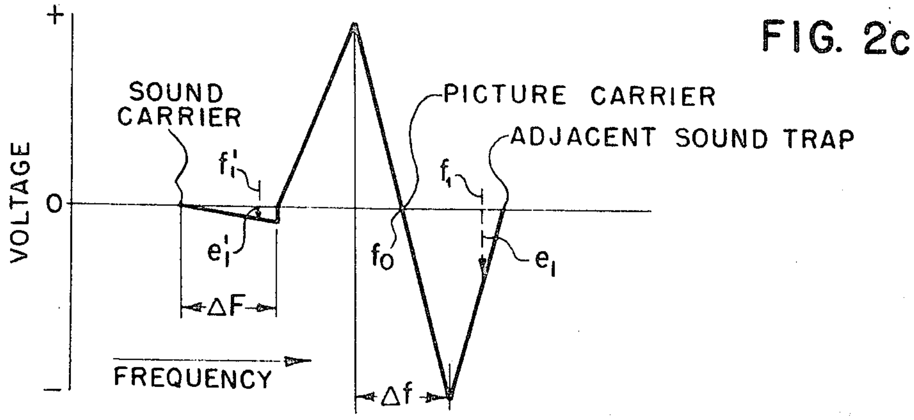

The curve of FIGURE 2*c* represents, in idealized form, the frequency response of a discriminator that would minimize this dificiency of prior arrangements. For the same assumed frequencies of video and sound components, designated $f_1$ and $f_1'$, the error voltages $e_1$ and $e_1'$ are now of like polarity and aid one another. The net error voltage is enhanced and, being of negative polarity, reduces the operating frequency of the heterodyne oscillator as required to establish proper conditions of tuning. This has the effect of increasing the useful pull-in range of the AFC system and assures against locking to the sound carrier of the broadcast channel being tuned so long as the initial conditions of tuning give rise to an actual frequency of the audio IF component within the range $\Delta F$ over which the discriminator curve has a negative slope.

Figure 2D:
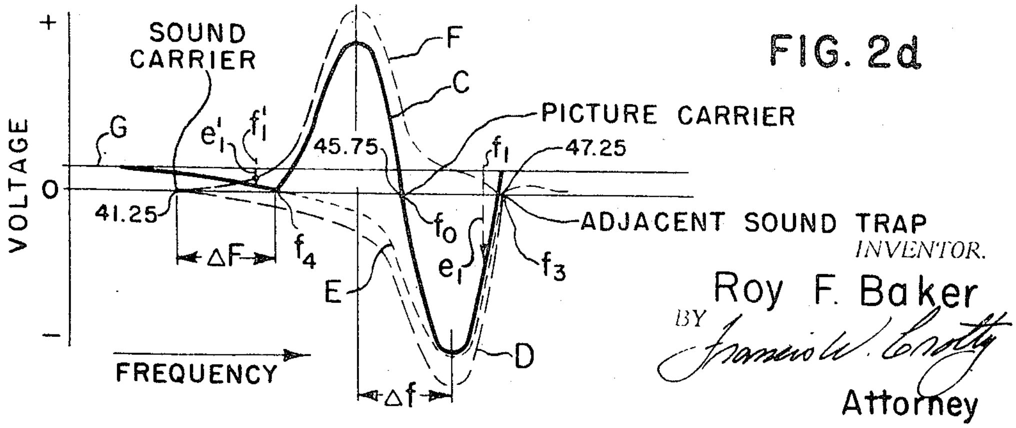

A close approximation to the idealized curve of FIGURE 2*c* is that of curve C in FIGURE 2*d*. It results from the effect of the forward bias of diode 38 in conjunction with the reverse bias of diode 39.

If the unbiased response of diode 38 to the IF signal is that of curve D, the effect of the forward bias is to raise the response by the amount of the bias as shown in curve E. If the response of diode 39 be that of curve F, the effect of the reverse bias is to eliminate so much of that response as lies below horizontal line G indicating the amount of the bias. The conjoint effect of the response of curve E and so much of response curve F as is above line G is that designated by curve C.

For any tuning condition in which both the video and sound IF components fall within the IF passband characteristic, the AF system derives a first control effect in response to the video IF component and a second control effect in response to the sound IF component. The variation of the first control effect with frequency deviation has a predetermined slope, specifically a negative slope, over a range $\Delta f$ centered about the desired frequency $f_0$ of the video IF component but has an opposite or positive slope for frequency deviations which extend from the high point of this range toward the IF frequency $f_3$ which approximately represents the sound carrier of the adjacent broadcast channel. With respect to the second control effect, its variation with deviations in frequency has a negative slope over another frequency range $\Delta F$ extending from the desired frequency of the audio component to higher frequencies. The range $\Delta F$ is at least approximately equal to, and preferably exceeds, the spacing of the desired frequency $f_0$ of the video IF component from IF frequency $f_3$. Expressed differently, this range is about half the frequency spacing of the desired values of the video and sound IF carriers. If it is at least this large or larger and if the magnitude of the second control effect varies proportionally with deviation as indicated in curve C, the net error voltage for deviations in frequency of the picture IF component above the range $\Delta f$ is greater than achieved with prior AFC systems and increases the pull-in range of the system.

Tuning of the discriminator network, especially the primary thereof, permits adjustment of the frequency $f_4$ at which the response of the detector to the sound carrier, having changed its slope and decreased from a maximum, crosses the bias level G. Adjustment of this crossover permits obtaining a symmetrical pull-in range for the AFC system. Experience has determined that the described system is capable of providing a pull-in range of ±2 megacycles whereas the pull-in range of conventional AFC systems is less than +1 and −2 megacycles.

One embodiment of the AFC system that has been constructed and successfully utilized employed the following circuit components which are given by way of illustration and not limitation of the invention:

| | | |
|---|---|---|
| Resistor: | | |
| 26 | ohms | 220 |
| 30 | do | 100 |
| 31 | do | 10,000 |
| 32 | do | 1,000 |
| 40 and 41 | do | 470,000 |
| 44 | do | 10,000 |
| 51 | do | 1,000 |
| 52 | megohms | 1 |
| Capacitor: | | |
| 22 | pf | 10 |
| 23 | pf | 220 |
| 24 | pf | 0.2 |
| 27 | pf | 1,000 |
| 29 | pf | 4 |
| 33 | pf | 1,000 |
| 36 | pf | 10 |
| 37 | pf | 10 |
| 43 | pf | 100 |
| 53 | mfd | 0.2 |
| Diodes 38, 39 | | Type IN542M |
| Transistor: | | |
| 25 | | Type RCA-40239 |
| 50 | | Type Fairchild SE4010 |
| Bias source + | volts DC | 21 |

A form of turnable heterodyning oscillator that may be controlled by the described AFC system with unusual advantages is represented in FIGURE 3. The oscillator is of the triode type comprising a tube 60 having a cathode connected to ground and an anode connected to one terminal of an inductor 61. The other terminal of the inductor is connected through a capacitor 62 to the control electrode of the tube which is returned to ground through a resistor 63. The remaining capacitors of the oscillator include a condenser 64 which is part of the tuning capacitance of inductor 61 to ground, a fixed capacitor 65 and a voltage dependent capacitor 66 which is known in the art as a varicap. Capacitors 65 and 66 are connected in series and are also a part of the tuning capacitance of inductor 61. Operating potential is applied to the anode of the triode from a source +B through an RF choke 67 which is bypassed by a capacitor 68. Another choke 69 which is bypassed by a capacitor 70 is coupled between the junction of capacitors 65, 66 and the output derived at the high potential terminal of resistor 51 of AFC system 20.

This is a conventional form of triode oscillator but the arrangement of the voltage dependent capacitor 66 and its coupling with the AFC system are unusual and distinctly advantageous. With this arrangement, the AFC voltage is applied from a source which represents a very low D.C. impedance; specifically, it is the 1K output load of emitter follower 50. It is apparent that the oscillations developed in the tank circuit including inductor 61 are applied to varicap 66 which in conjunction with capacitor 65 constitutes a voltage divider across the tank. The varicap is physically a reverse biased diode and may rectify the high frequency oscillations under large signal levels. Accordingly, if the AFC system is a high impedance source across the varicap, a substantial voltage is developed by rectification of the RF which opposes the AFC correction voltage and may cause the AFC system to lose its control of the oscillator. With the described arrangement, the voltage due to such rectification is shunted to ground by a low impedance source to the end that it has no materially adverse effect on the control of the oscillator by the AFC system. The varicap, as is well known in the art, is a capacitive reactance and its magnitude is determined by the voltage applied across it. The operating bias, assuming that there is zero AFC error voltage being developed, is that which is applied to the varicap because of the potential drop of emitter load 51. Error voltages developed in the AFC system in the face of frequency deviations of the video IF carrier from its desired value modify the normal operating bias of the varicap both in direction and amount to control the operating frequency of the heterodyne oscillator and maintain the desired frequencies of the video and audio IF components.

The portion of the discriminator characteristic of FIGURE 2*c* immediately adjacent the desired frequency of the audio component and from which the aforedescribed second control effect is derived results from the polarity of the bias voltage applied to diodes 38, 39 of the FM detector. If a bias of opposite polarity is applied to the diodes, the same type of modification will be made to the discriminator characteristic only for this case the modification will occur at the opposite end of the IF band. The magnitude of the bias is not critical; it is usually selected to attain the required operating bias of varicap 66 which, as explained, is developed across output impedance 51 of the AFC system.

The described AFC system with an improved pull-in range has general applicability to television receivers but is especially valuable for receivers adapted to accept UHF channels. Tuning devices for the UHF band are critical in adjustment and the described AFC system is most useful in tuning to a UHF channel. Its advantages are most fully realized in the case of color broadcasts since the quality of the image in simulated natural color is very dependent on the degree of tuning.

One form of commercially available UHF tuner comprises rotor elements that are concurrently displaceable with respect to stators to tune over the entire UHF range with a single revolution of the shaft on which the rotors mount. If a ratchet and pawl assembly is associated with the rotor shaft so that it may be tuned in only one direction, namely, to sweep the IF frequency continuously from low to high values in covering the UHF range, the system will not lock at all on a sound IF carrier and the AFC will acomplish exact tuning for each station in the band. Of course, the AFC has been described as tuning on the video IF carrier which is conventional but it may also be tuned to the sound IF carrier if that should be desired.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a television receiver having a tunable input stage, including a variable frequency heterodyne oscillator, for selecting a particular broadcast channel comprising a video modulated carrier and an audio modulated carrier having a fixed frequency separation from one another and for deriving therefrom an intermediate frequency signal having video and audio components of desired respective values, an automatic frequency control system comprising:

means, including a common frequency modulation detector responsive to said intermediate frequency signal, for developing a first control effect of a predetermined polarity and of a magnitude dependent upon deviation in a predetermined direction of the actual frequency of said video IF components from its aforesaid desired value, and for concurrently developing a second control effect of the same predetermined polarity and of a magnitude dependent upon deviation in said predetermined direction of the actual frequency of said audio IF component from its aforesaid desired value;

and means for utilizing both of said control effects to control the operating frequency of said heterodyne oscillator and maintain the frequencies of said video and audio IF components at their aforesaid desired values.

2. An automatic frequency control system in accordance wtih claim 1 in which the magnitude of said second control effect is proportional to the deviation of the actual frequency of said audio components from its desired value.

3. An automatic frequency control system in accordance with claim 1 in which the second control effect is derived over a range of frequency deviations of said audio component which is approximately equal to half the frequency spacing of said desired frequencies of said video IF component and said audio IF component.

4. An automatic frequency control system in accordance with claim 1 in which the magnitude of said first control effect increases proportionally with deviations to a maximum value at a peak frequency between said desired frequency of said video component and another IF frequency representing the sound carrier of the adjacent broadcast channel but then decreases to zero as the frequency of said video component approaches said other IF frequency, and further in which the magnitude of said second control effect increases proportionally with deviations of said audio component which accompany deviations of said video component between said peak frequency and said IF frequency.

5. An automatic frequency control system in accordance with claim 4 in which the magnitude of said second control effect decreases toward zero for still greater deviations in frequency of said audio component.

6. An automatic frequency control system in accordance with claim 1 in which variations of said first control effect with frequency deviation has a predetermined slope over a predetermined range centered about said desired video IF frequency but has an opposite slope for deviations from the highest frequency point of said range to another IF frequency representing the sound carrier of the adjacent broadcast channel, further in which variations of said second control effect with frequency deviation has said predetermined slope over another range extending from said desired audio IF frequency to higher frequencies, and in which the frequency span of said other range is at least approximately equal to the frequency spacing of said desired video IF frequency from said other IF frequency.

7. An automatic frequency control system in accordance with claim 1 in which said frequency modulation detector comprises a discriminator network having a pair of output terminals, a pair of rectifiers coupled to opposed terminals of said network, load circuits for said rectifiers coupled in series opposition to one another and means for biasing one of said rectifiers into a conductive condition and for biasing the other of said rectifiers into a non-conductive condition.

8. An automatic frequency control system in accordance with claim 7 in which the rectifiers of said frequency modulation detector are diodes one of which is forward biased a predetermined amount while the other is reverse biased a like amount.

9. An automatic frequency control in accordance with claim 7 in which said heterodyne oscillator has a voltage dependent tuning element and in which said means for utilizing said control effects to control the operating frequency of said oscillator also establishes an operating bias for said voltage dependent element.

References Cited

UNITED STATES PATENTS

| | | | |
|---|---|---|---|
| 2,891,105 | 6/1959 | Keizer. | |
| 2,953,637 | 9/1960 | Baugh. | |
| 3,028,448 | 4/1962 | Baugh | 178—5.8 |
| 3,370,123 | 2/1968 | Gassman | 178—69.5 |

RICHARD MURRAY, Primary Examiner

ALFRED H. EDDEMAN, Assistant Examiner

U.S. Cl. X.R.

178—5